May 22, 1956 — P. F. RENNER — 2,746,082
DEVICE FOR REMOVING SCALES FROM FISH
Filed June 14, 1951
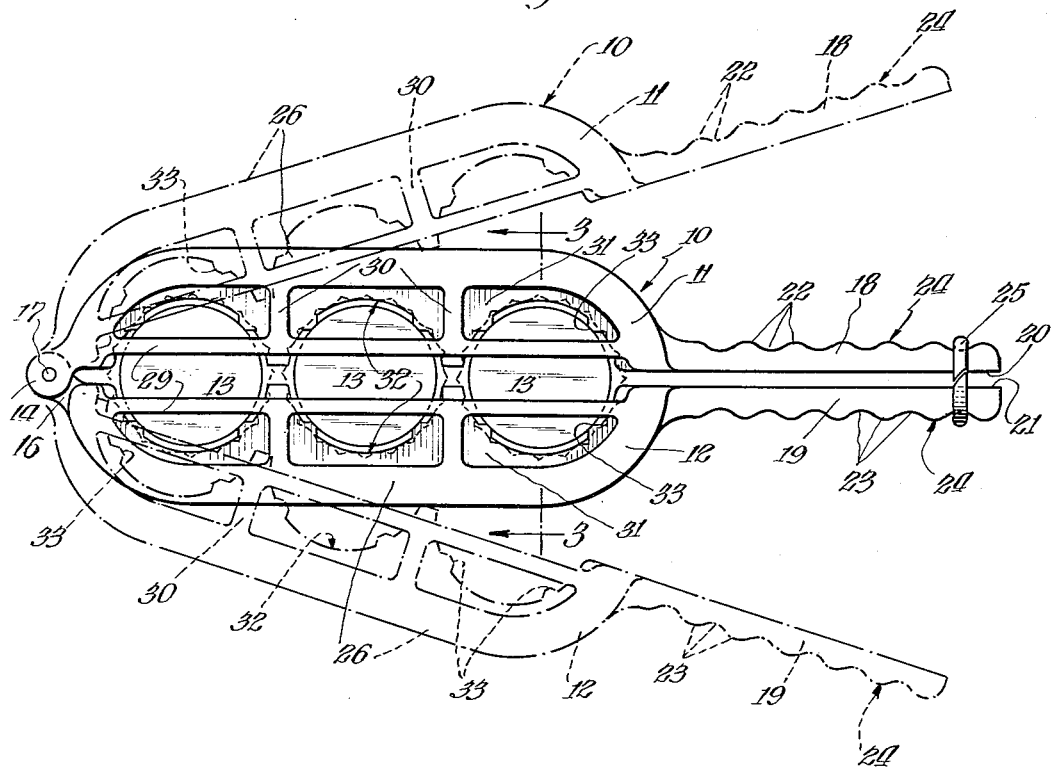
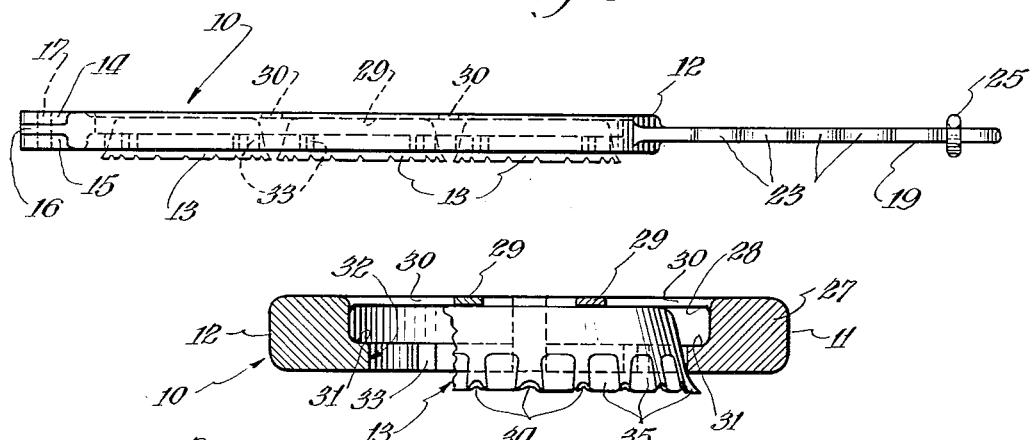
Inventor:
Philip F. Renner
By: Archibald D. McKellar
Attorney.

United States Patent Office 2,746,082
Patented May 22, 1956

2,746,082

DEVICE FOR REMOVING SCALES FROM FISH

Philip F. Renner, Chicago, Ill.

Application June 14, 1951, Serial No. 231,492

6 Claims. (Cl. 17—7)

The invention relates in general to devices for removing scales from fish by manual operation, but more particularly to tools and devices of this general usefulness, and has for its objects the provision of a device of this category which is simple in construction, economical to manufacture, and highly efficient in use.

Other objects will hereinafter appear.

The invention consists of the combinations and arrangements of parts hereinafter described and claimed and embodying the invention.

The invention will be best understood by reference to the accompanying drawings forming a part of this specification, and in which—

Fig. 1 is a top plan view of my invention in closed position for use, and in open position in dot-and-dash line for the purpose of the insertion of substitute scaling elements;

Fig. 2 is a side view of Fig. 1; and

Fig. 3 is an enlarged section taken on line 3—3 of Fig. 1.

A practical and preferred embodiment of the invention is illustrated in the drawings and comprises a clamp unit 10 having right and left companion body members 11 and 12, respectively, arranged in opposed relation, as best shown in Fig. 1. The body members 11 and 12 are arranged in the same plane and adapted to operatively confine and retain shallow cups 13 which are provided with protruding scale-engaging elements of a common form which will be hereinafter more particularly described.

The companion body members 11 and 12 are each of integral construction of either a suitable plastic, or metal, as may be desired. The companion body members 11 and 12 are connected at one end thereof with a flat leaf hinge comprising two spaced leaves 14 and 15 on companion body member 11, and a single intervening leaf 16 on the other companion body member 12. The hinge leaves 14, 15 and 16 are hingedly secured together by a pivot 17. At the opposite ends of the companion body members 11 and 12, each carries an outwardly extending handle 18 and 19, respectively. The said handles 18 and 19 are arranged in spaced and parallel alignment relative to the plane of the pivot 17. Each of the handles 18 and 19 have straight adjoining inner edges 20 and 21, and waved outer edges 22 and 23 having transversely aligned notches 24, arranged and adapted to hold the handles 18 and 19 in releasable latched position by a split ring 25 which is adapted to be slidably mounted over the ends of the handles 18 and 19.

The right and left companion body members 11 and 12 of the clamp 10 comprise elongated half-frame portions 26 extending between the hinge leaves 14, 15 and 16 and the handles 18 and 19. The companion body members 11 and 12 being of integral construction, the half-frame portions 26 have an outer side wall 27 quarter-rounded at both ends and provided with inwardly extending ledge 28 which is connected by a top closure bar 29 extending longitudinally from approximately end to end of said ledge 28. Short top closure bars 30, two in number, are each located approximately one-third of the intervening space between the curved end portions of said side wall 27. The half-frame portions 26 of both companion members 11 and 12 are provided with a shelf 31 arranged below the top closure bar 29 and the short closure bars 30 in spaced relation therewith. The shelf 31 is provided with arcuately curved walls 32 adapted to conform with the opposed walls of the shallow cups 13. The inner surface of the walls 32 are provided with inwardly projecting teeth 33 adapted to engage the outwardly projecting portions of the cups 13 when the clamp 10 is in closed engagement, and serve to prevent rotation or displacement of the cups 13 when in operational engagement.

The arrangement is such that the edges or rims of the cups 13 protrude sufficiently below the surface of the clamp 10 to engage the scales of a fish when rubbed over the surface of a fish. The contacting edge of the cups 13 shown in the drawings (Figs. 2 and 3) comprise an alternate arrangement of horns 34 and scoops 35 whereby the horns 34 serve to lift the accumulated scales, and the scoops 35 to scrape the skin of the fish.

While I have illustrated and described my invention in detail, this is capable of variations and modifications without departing from the invention. I, therefore, do not wish to be limited by the disclosure herein but desire to avail myself of such changes, alterations and adaptations which may fall within the spirit and scope of the appended claims forming a part of this application.

I claim:

1. In combination a manually operated scaling device for fish comprising a pair of elongated body members of integral construction; cooperating leaf hinge portions on each body member at one end thereof; pivot means for hingedly connecting said cooperating leaf hinge portions; a half-frame portion on each of said body members comprising a side wall; an inwardly projecting ledge on said side wall; a plurality of closure bars joined to said ledge, a plurality of inverted cups held between said body members and below said closure bars, said cups having serated edges arranged in outwardly protruding position; a shelf arranged in spaced and parallel relation with said closure bars; a plurality of arcuately arranged projecting walls adjacent said shelf, each in alignment to contact a portion of a cup adjacent its bottom; an outwardly projecting handle on each half-body portion arranged and adapted to be adjusted in spaced and parallel relation to each other; curved outer edges on each of said handles; and a split ring adapted to be retained in said curved outer edges.

2. In combination, a fish scaler clamp unit comprising a right companion body member; and a left companion body member; cooperative flat hinge elements at one end of each of said companion body members; a pivot hingedly connecting said hinge elements; a handle on each of said companion body members extending outwardly from the opposite end thereof; releasable means adapted to hold said handles in spaced and parallel relation; an intermediate half-frame portion on each of said body members comprising a side wall curved at its ends; an inwardly projecting ledge on said side wall; a top closure bar arranged to connect said side wall adjacent its ends; short closure bars arranged transversely and connecting said top closure bars with said ledge; a shelf arranged in spaced and parallel relation below said top closure bars; a plurality of arcuate walls on each of said shelves to contact the circumference of a cup; a plurality of fish scaling cups between said walls, and a plurality of teeth projecting inwardly from said arcuate walls arranged and adapted to engage the wall of said cups to prevent rotation thereof.

3. In combination, a fish scaling device comprising a pair of elongated members having a mutual hinged connection at one end thereof; at least one opposed pair of half-frame portions arranged adjacent said hinge; a side wall, curved at its ends; a closure wall on one side of each half-frame portion; a shelf arranged within each frame portion in spaced relation to said closure wall; a plurality of walls adjacent said shelf arranged and adapted to engage the outer wall of an inverted cup; an inverted cup held between said shelves, said cups having scale-removing surfaces exposed below said frame portions, inwardly projecting teeth carried by said shelf in said walls in position to circumferentially engage said cup to prevent rotation thereof; a combined handle and latch portion of the other end of said half-frame portion arranged and adapted to receive a releasable split ring.

4. In combination a device for holding a plurality of abrasive cups for removing scales from fish comprising a clamp unit having right and left companion body members constituting a pair; hinge means on each member of said pair; a pivot connecting said hinge means to each other at one end; a handle on the other end of each member extending outwardly therefrom; releasable means for holding said handles in spaced and gripping parallel relation; a half-frame portion between said hinge and said handle on each of said pairs, each having a side wall inwardly curved at its ends; an inwardly projecting ledge on each side wall, said ledges being in register with each other; a longitudinal closure bar connecting said ledge adjcent its inner ends; short closure bars in spaced arrangement connecting one of said longitudinal half-frame portions with the side portions of its opposite and inwardly projecting ledge; a shelf extending in spaced and parallel relation below said longitudinal bar; a plurality of arcuate walls on the inner edge of said shelf, said walls being adapted to engage an outer portion of the circumference of a conventional inverted cup; and a plurality of inwardly projecting teeth in each of said side walls arranged and adapted to engage the side wall of its respective inverted cup to prevent release thereof when the said handles are in mutual engagement.

5. In a fish scaling implement adaptable for use with exhaustible and readily replaced working elements, a pair of half-frame members comprising a pair of elongated jaws, a handle for each jaw, a hinge means for said jaws, each of said jaws having a group of corresponding semicircular recesses adapted to form generally circular walls adapted to peripherally enclose such working elements, a plurality of inwardly projecting teeth symmetrically arranged integral with said walls, and a plurality of closure bars over each of said groups of semicircular recesses, whereby said working elements are held in said jaws in abutment with said closure bars and secured by said inwardly projecting teeth.

6. The implement of claim 5 wherein the working elements are a plurality of bottle tops of the crown cap type.

References Cited in the file of this patent

UNITED STATES PATENTS

| | | |
|---|---|---|
| 491,872 | Canfield | Feb. 14, 1893 |
| 2,396,388 | Reenstierna | Mar. 12, 1946 |
| 2,538,435 | Wegner | Jan. 16, 1951 |